United States Patent
Büchner et al.

(10) Patent No.: US 8,172,718 B2
(45) Date of Patent: May 8, 2012

(54) PLANETARY GEAR UNIT AND METHOD FOR PRODUCING A PLANETARY GEAR UNIT

(75) Inventors: Tobias Büchner, Illingen (DE); Peter Höhne, Friedrichsthal (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 552 days.

(21) Appl. No.: 12/446,889

(22) PCT Filed: Oct. 10, 2007

(86) PCT No.: PCT/EP2007/060773
§ 371 (c)(1),
(2), (4) Date: Apr. 24, 2009

(87) PCT Pub. No.: WO2008/049730
PCT Pub. Date: May 2, 2008

(65) Prior Publication Data
US 2009/0286644 A1      Nov. 19, 2009

(30) Foreign Application Priority Data

Oct. 24, 2006  (DE) .......................... 10 2006 049 996

(51) Int. Cl.
*B21D 53/10* (2006.01)
*F16H 57/08* (2006.01)

(52) U.S. Cl. ..................................... 475/348; 29/898.07
(58) Field of Classification Search .................. 475/348; 29/460, 893, 898.07
See application file for complete search history.

(56) References Cited

U.S. PATENT DOCUMENTS

| 6,651,336 B1 * | 11/2003 | Bauknecht et al. ............. 29/893 |
| 6,663,531 B2 * | 12/2003 | Skrabs .......................... 475/348 |
| 2006/0112531 A1 | 6/2006 | Skrabs |

FOREIGN PATENT DOCUMENTS

| DE | 697557 | 10/1940 |
| DE | 1 214 536 B1 | 6/2002 |
| DE | 10 2004 057 576 A1 | 6/2006 |
| EP | 1 266 154 B1 | 12/2002 |

OTHER PUBLICATIONS

K. Lange, Umformtechnik, vol. 3, Metal Sheet Working, Springer 1990, p. 152 ff.

* cited by examiner

*Primary Examiner* — Dirk Wright
(74) *Attorney, Agent, or Firm* — Davis & Bujold, P.L.L.C.

(57) ABSTRACT

A planetary gear unit (1) having two guide discs (2, 3) that are arranged parallel to one another and include perforations for accommodating pins (4) which have journals (5, 6) and shoulders arranged on the end sides. The shoulders have circumferential cutting edges (11, 12) and the pins (4) are cut into the guide discs (2, 3) by way of the cutting edges (2, 3).

20 Claims, 3 Drawing Sheets

PLANETARY GEAR UNIT AND METHOD FOR PRODUCING A PLANETARY GEAR UNIT

This application is a National Stage completion of PCT/EP2007/060773 filed Oct. 10, 2007, which claims priority from German patent application serial no. 10 2006 049 996.4 filed Oct. 24, 2006.

FIELD OF INVENTION

The present invention relates to a planetary gear unit as well as a method for producing a planetary gear unit.

BACKGROUND OF THE INVENTION

A planetary gear unit, also called a planetary gear set, in general consists of a planet carrier (planetary gear carrier), a planet pin (planetary gear pin) mounted in the planetary carrier, as well as planets (planetary gears) which are mounted on the planet pins. The planetary carrier may be constructed from a forming part with angled arms and a guide disc or from two parallel guiding washers which are connected to one another via rivet bolts. A planet carrier of this type has been known from EP 1 214 536 B1 by the applicant, whereby the rivet bolts are peened with the guide discs. The guide discs are manufactured as fine-blanking parts and have perforations into which rivet bolt journals arranged on the end side are inserted and subsequently peened. When securing the journal the knife edge rings engage, on the one hand, with the guide disc from the tool side and, on the other hand, from the rivet bolt side, and thus prevent the material from giving way.

Fine-blanking is a known method which has been defined by K. Lange, Umformtechnik, Vol. 3, Metal sheet working, Springer 1990, p. 152 ff. as follows: "Fine-blanking refers to the cutting out and perforation process of work pieces made of flat metal products with specifically modified stress conditions in the shearing zone without fissures on the cut surface used as functional surface by means of a blanking die, blanking stamps, blank holders and ejectors". Immediately before blanking, a knife edge ring is pressed into the work piece (metal sheet) at a small distance from the cutting line, as a result of which compression stresses are superimposed in the shear zone. The final outcome will be a smooth and fissure-free cut surface.

From EP 1 266 154 B1 by the applicant a method has been known for an accurately positioned assembly of a planetary gear unit, whereby the planet pins are peened with the guide discs in a similar manner as the above mentioned rivet bolts. The planet pins have shoulders and journals on the end side which are inserted with a radial clearance into the perforations of the guide discs. The journals are then peened and the radial gap filled by the material of the journal that has been displaced outward. The material of the guide discs is clamped in the area of the perforations by the meshing knife edge rings.

Another method for the accurately positioned assembly of a planetary gear unit has been known from DE 10 2004 057 576 A1 by the applicant, whereby the planet pins are centered and aligned opposite to the guide discs prior to being peened. The planet pins have open lengthwise bores on the end side with which conical tips of opposed dies mesh and thus achieve an alignment.

The problem with the known methods for the assembly of a planetary gear unit is the exact centering and alignment of the planet pin such that optimal meshing of the teeth of the planetary gears with the corresponding sun and ring gear is ensured. Potential solutions still result nonetheless.

SUMMARY OF THE INVENTION

The object of the present invention is to so improve a planetary gear unit of the above mentioned type as regards its design, that accurate centering and alignment of the pins, in particular of the planet pins, is achieved. Moreover, it is the object of the present invention to accomplish a method for producing a planetary gear unit of this type, which allows for an accurately positioned assembly of the components of the planetary gear unit.

According to the present invention, it is provided that the pins have circumferential cutting edges and are cut into the guide discs by means of these cutting edges. The pins have a diameter in the area of the circumferential cutting edges that is greater than the pre-drilled aperture in the guide discs, e.g. the pins are oversized relative to the diameter of the perforations. By cutting the pins into the guide discs, a clearance-free fit and smooth surface is achieved for the transmission of forces between the pin and the guide discs. The pins may be partially or totally cut into the guide discs; a ring-shaped waste clipping results from the "cutting through".

The planetary gear unit preferably comprises a planet carrier which is formed by two guide discs that are connected to one another by rivet bolts. A planet carrier is, however, also possible that has no rivet bolts, but instead a forming part with arms replacing the rivet bolts which are connected to a guide disc. The pins may preferably be configured as planet pins, as rivet bolts, or also as rivet bolts and planet pins which thus satisfy the function of a planet pin as well as a rivet bolt. By cutting the pins into the guide discs, the advantage is also achieved that only small forces are introduced radially into the guide discs—in contrast to the prior art, where a radial widening occurs as a result of the peening.

A preferred embodiment of the present invention provides that the depth of the incision, i.e. the path of the cutting edges into the material of the guide discs, approximately corresponds to half the thickness of the guide discs. The material of the guide discs that is displaced by the cutting edges abuts on the shoulders and journals of the pins after ending the cutting process. The outer side of the guide discs thus remains flat. The ring of displaced material hence forms an axial abutment of the planet pins in the guide discs.

According to the inventive method, guide discs are first pre-drilled, which may be accomplished by fine-blanking. The diameter of the bore is significantly larger than the outer diameter of the journals, so that the journals of the pins may be inserted with radial clearance into the perforations. On the other hand, the outer diameter of the pins in the area of the circumferential cutting edges is larger than the inner diameter (bore diameter) of the perforation, i.e. it is oversized relative to the bore. The planetary gear unit is completed before the second guide disc is placed on the pins, i.e. the necessary components are entirely assembled, for example planetary gears, starting discs, etc. Subsequently, the guide discs are moved toward one another by opposed dies such that the cutting edges of the pins cut into the core of the guide discs and radially displace this material in the cutting directions as well as transversely to the cutting direction. Thus the previously existing radial gap between the journals and perforations is filled.

According to a preferred embodiment, the dies have knife edge rings that dig into the outer side of the guide discs or mesh with prefabricated grooves, produce compression stress and prevent the material from moving outward in the radial direction. The material of the guide disc is consequently clamped between the knife edge rings of the spinning tool and the circumferential cutting edge of the pin which thus acts as a cutting die. The superimposed compression stress produces a cutting process similar to fine-blanking which results in a smooth, fissure-free cut surface in the guide disc. This advantageously results in a clean seat of the pin on the guide disc and a defined transmission of tangential forces. The depth of the incision is also a function of the admissible contact surface pressure between pin and guide disc.

According to a preferred process step, it is provided that the pins are centered and aligned before the knife edge rings mesh or cut in. This may be carried out by correspondingly aligned dies provided with conical tips which mesh with end-side centering apertures of the pins and thus achieve the desired centering. After the centering process, the knife edge rings holding the guide disc mesh and subsequently or simultaneously cut in the cutting edges.

BRIEF DESCRIPTION OF THE DRAWINGS

An exemplary embodiment of the present invention is illustrated in the drawings and will be explained in more detail in the following section. The drawings show.

DETAILED DESCRIPTION OF THE PREFERRED EMBODIMENTS

Figure 1:
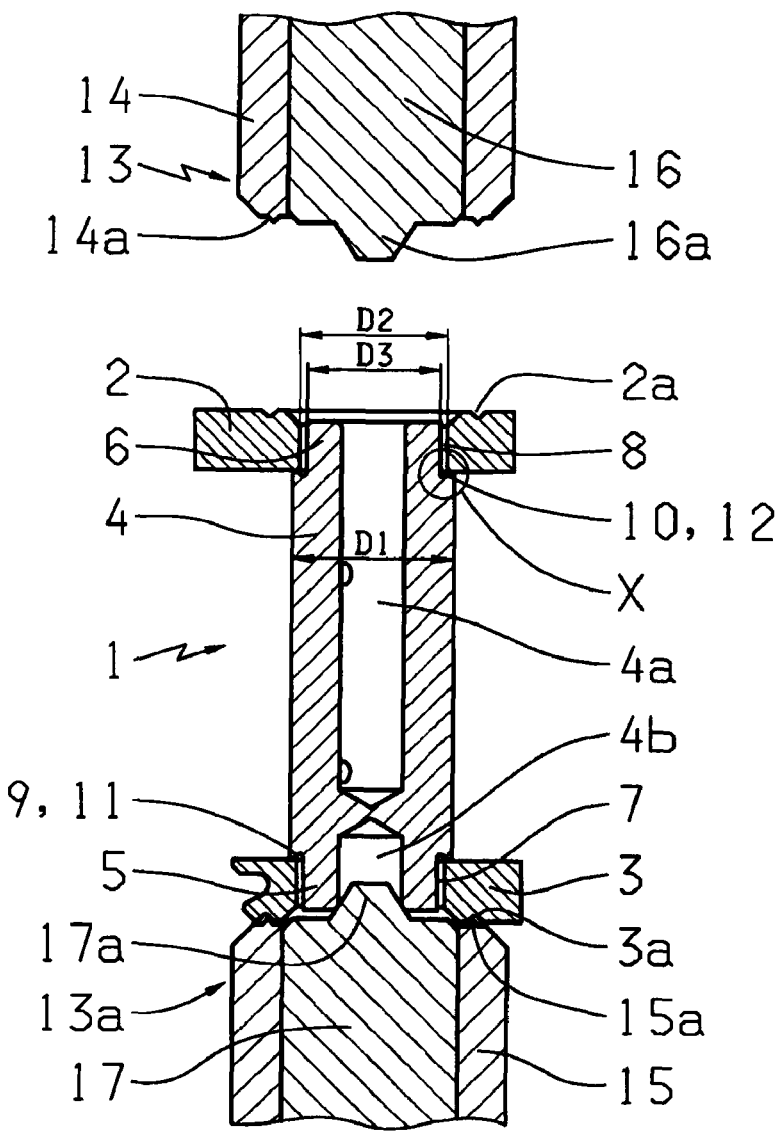
FIG. 1 a cross section of a planetary gear unit after a first process step.

FIG. 1 shows a cross sectional view of a pre-assembled planetary unit 1 of which a first guide disc 2 and a second guide disc 3 are partly illustrated. Both guide discs 2, 3 may be connected to one another by a rivet bolt, which is not illustrated, or one of both guide discs may be configured as a pot-shaped forming part with arms which assume the function of rivet bolts. A planet pin 4, which has journals 5, 6 on the end side is arranged between both guide discs 2, 3. Bores 7, 8 (perforations) are arranged in the guide discs 2, 3, which bores are preferably—similarly to all guide discs 2, 3—produced by fine-blanking, as a result of which smooth and fissure-free cut surfaces are obtained. The planet pin 4 has an outer diameter D1 between the guide discs 2, 3, the bore 8 has an inner diameter D2 and the journal 6 has an outer diameter D3, whereby the following relationship applies:

D1>D2>D3.

Figure 1A:
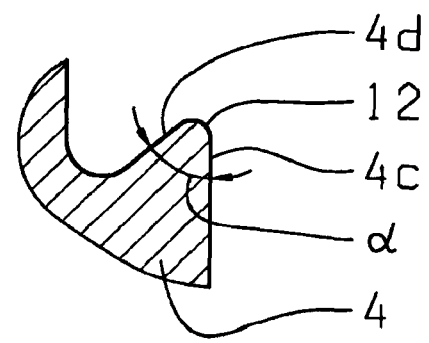
FIG. 1a a detail X from FIG. 1.

The outer diameter D1 of the planet pin 4 is recessed relative to the journals 5, 6 via a shoulder 9, 10 which is configured as a circumferential cutting edge 11, 12 in its outer radial area and is shown enlarged in FIG. 1a. The planet pin 4 has a lengthwise bore 4a which is open toward the end side of the journal 6, as well as a coaxially arranged blind hole 4b which is open toward the end side of the journal 5.

FIG. 1 further shows a device 13 for accomplishing the method according to the present invention, in particular for an accurately positioned assembly of the planetary gear unit 1. The device 13 has a bottom part 13a and an upper part 13b which respectively consist of a sleeve-shaped pressing tool 14, 15 and an axially displaceable die 16, 17 guided therein. The sleeve-shaped pressing tools 15, 16 have a circumferential knife edge ring 14a, 15a at their end surfaces which engage in a ring-shaped groove 2a, 3a of the guide discs 2, 3.

The dies 16, 17 have truncated conical tips 16a, 17a on their end sides which mesh with the lengthwise bore 4a and/or the blind hole 4b. The position of the device 13 illustrated in FIG. 1 shows the meshed bottom part 13a, whereas the upper part 13b is still out of mesh. The planetary gear unit 1 rests upon the sleeve-shaped pressing tool 15 with its lower guide disc 3, whereas the knife edge ring 15a meshes with the ring groove 3a. The centering journal 17a further meshes with the blind hole 4b and thus already centers the lower part of the planet pin 4 inside the bore 7. The planetary gear unit 1 is already completely in this position, which is not illustrated, i.e. all components like planet gears, starting discs, rivet bolts to be arranged between the guide discs 2, 3, are completely pre-assembled.

FIG. 1a shows the detail X from FIG. 1 as an enlarged view of the circumferential cutting edge 12 of the shoulder 10. The cutting edge 12 is essentially formed by two surfaces, namely the cylindrical lateral surface 4c of the planet pin 4 and a conical or concave cut surface 4d which comprises a cutting angle α with the lateral surface 4c that preferably is smaller than 90°. The cutting edge 11 is similarly configured.

Figure 2:
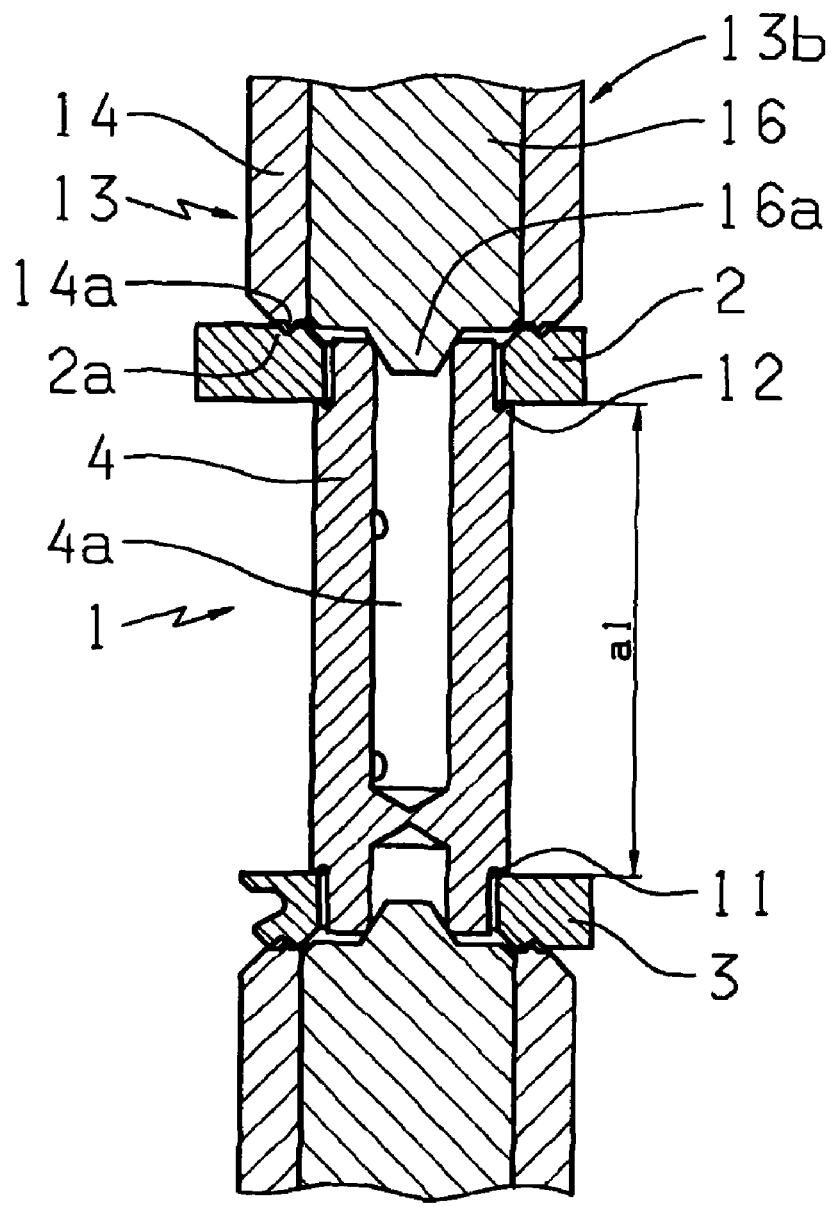
FIG. 2 a cross section a planetary gear unit after a second process step.

FIG. 2 shows the planetary gear unit 1 according to FIG. 1 as well as the device 13 in a second process step. The same reference numerals as in the previous drawing are used for the same parts. The upper part 13b of the device 13, consisting of the sleeve-shaped pressing tool 14 and the die 16 guided therein, has been driven down so far that the centering tip 16a meshes with the bore 4a and the knife edge ring 14a meshes with the groove 2a. This way, on the one hand, the planet pin 4 is centered relative to both guide plates 2, 3 and, on the other hand, the guide discs 2, 3 are clamped relative to the cutting edges 12, 11. The distance of the inner surfaces of both guide discs 2, 3 is designated with a1 and corresponds to the distance of both circumferential cutting edges 11, 12 in the longitudinal direction of the planet pin 4.

Figure 3:
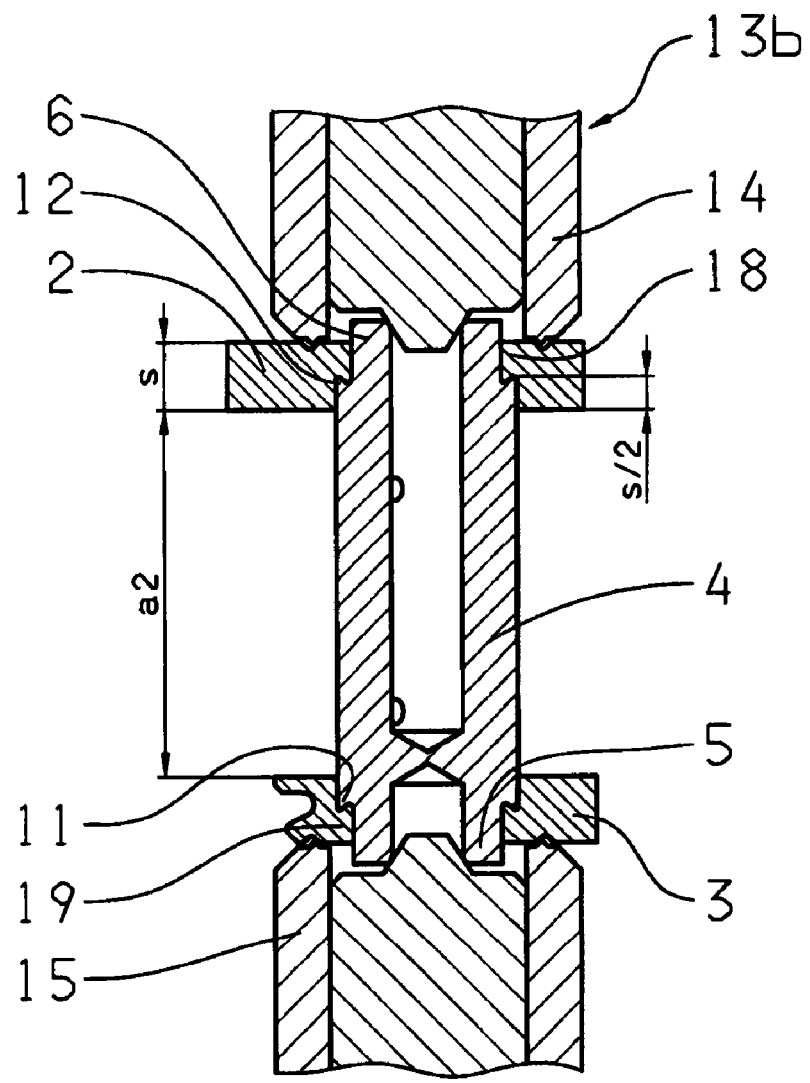
FIG. 3 a cross section of a planetary gear unit after the last process step, i.e. in finished condition.

FIG. 3 shows the planetary gear unit 1 as well as the device 13 after the last process step, i.e. the connection between planet pin 4 and guide discs 2, 3, is completed. As a result of further pressure, the sleeve-shaped pressing tools 14, 15 have driven against one another and in this process have moved the guide discs 2, 3 toward one another so that they now have a distance a2 which is smaller than the previous distance a1 according to FIG. 2. At the same time, the planet pin 4 has cut into the material of the guide plates 2, 3 with its cutting edges 11, 12, namely up to an incision depth s/2, where s is the thickness of a guide disc 2, 3. The material of the guide discs 2, 3 displaced by the cutting process forms a ring-shaped area 18, 19, designated hereafter as displacement ring 18, 19 which is respectively located in the cutting direction in front of the cutting edges 11, 12 encompassing the journals 5, 6, i.e. the previous ring gap 7, 8 (cf. FIG. 1) is at least partially filled up. Since the material displaced by the cutting process, in particular also by the inclined cut surface 4d illustrated in FIG. 1a, is not only displaced upward but also radially inward, the outer surfaces of the guide discs 2, 3 remain relatively even. The upper part 13b of the device may now be retracted, and the planetary gear unit 1 may be removed from the device 13 as a completely assembled part.

The method according to the present invention for cutting the planet pins into the guide disc is very similar to the known fine-blanking process, in particular because of the use of the knife edge rings which superimpose a compression stress on the shear stress in the shearing zone of the guide disc, thus causing the material to flow. This results in a smooth cut surface in the guide disc which is less notch-sensitive and prevents the appearance of fissures.

The above mentioned method may likewise be used on rivet bolts or pins which function as a planet pin as well as a rivet bolt.

Reference Numerals
1 Planetary gear unit
2 Guide disc
2a Groove
3 Guide disc
3a Groove
4 Planet pin
4a Lengthwise bore
4b Blind hole
4c Lateral surface
4d Cut surface
5 Journal
6 Journal
7 Bore
8 Bore
9 Shoulder
10 Shoulder
11 Cutting edge
12 Cutting edge
13 Device
13a Bottom part
13b Upper part
14 Pressing tool
14a Knife edge ring
15 Pressing tool
15a Knife edge ring
16 Die
16a Centering tip
17 Die
17a Centering tip
18 Displacement ring
19 Displacement ring
D1 Outer diameter pin
D2 Inner diameter bore
D3 Outer diameter journal
a1 Distance of the guide discs before cutting in
a2 Distance of the guide discs after cutting in
s Wall thickness of the guide discs

The invention claimed is:

1. A planetary gear unit (1) having two guide discs (2, 3) which are arranged parallel to one another and each of the guide discs (2, 3) having a perforation (7, 8) therein for receiving an end of a pin (4),
each end of the pin (4) having a journal (5, 6) for being received within the perforation (7, 8) and a shoulder (9, 10) for engaging with one of the guide discs (2, 3), with an outer diameter (D1) of the pin (4) being larger than both an outer diameter (D3) of the journal (5, 6) and a diameter (D2) of the perforation (7,8),
each of the shoulders (9, 10) having circumferential cutting edge (11, 12) which is at least hardened, in an area of the cutting edges (11, 12), for cutting into a surface of the guide discs (2, 3) during a cutting process, and
the shoulders (9, 10) being supported against a ring (18, 19) of displaced material of the guide discs (2, 3), generated by the cutting process so that, following the cutting process, both of the guide discs (2, 3) engage with the journal (5, 6), the shoulder (9, 10) and the outer diameter (D1) of the pin (4) and connect the guide discs (2, 3) to the pin (4).

2. The planetary gear unit according to claim 1, wherein the pins are planet pins (4) for mounting planetary gears.

3. The planetary gear unit according to claim 1, wherein the pins are rivet bolts for maintaining clearance and for transmission of forces between the guide discs (2, 3).

4. The planetary gear unit according to claim 1, wherein the pins are planet pins and rivet bolts.

5. The planetary gear unit according to claim 1, wherein the guide discs (2, 3) have a thickness in the area of the perforations (7, 8), and the cutting edges (11, 12) are incised up to approximately half the thickness of the guide discs (2, 3) during the cutting process.

6. The planetary gear unit according to claim 1, wherein ring-shaped grooves (2a, 3a) are arranged on the guide discs (2, 3), concentrically with respect to the perforations (7, 8), for meshing with knife edge rings (14a, 15a) of pressing tools (14, 15).

7. A planetary gear unit (1) comprising:
two parallel guide discs (2, 3) each having an aperture (7, 8);
a receiving pin (4) having opposed shoulders (9, 10) and opposed journals (5, 6), and an outer diameter (D1) of the pin (4) being larger than both an outer diameter (D3) of the journal (5, 6) and a diameter (D2) of the perforation (7,8),
each of the shoulders (9, 10) having circumferential cutting edge (11, 12), the cutting edges (11, 12) on the shoulders (9, 10) of the pin (4) being hardened; and
the cutting edges (11, 12) cutting into the guide discs (2, 3), during a cutting process, such that the shoulders (9, 10) abut a ring of material (18, 19) of the guide discs (2, 3) so that, following the cutting process, both of the guide discs (2, 3) engage with the journal (5, 6), the shoulder (9, 10) and the outer diameter (D1) of the pin (4) and connect the guide discs (2, 3) to the pin (4).

8. The planetary gear unit according to claim 1, wherein the receiving pin (4) has at least one axial bore (4a, 4b) formed therein.

9. The planetary gear unit according to claim 1, wherein the receiving pin (4) has a pair of opposed coaxial axial bores (4a, 4b) formed therein.

10. The planetary gear unit according to claim 1, wherein the cutting edge (11, 12) is substantially formed by a cylindrical lateral surface (4c) of the pin (4) and one of a conical or a concave surface (4d).

11. The planetary gear unit according to claim 10, wherein the cutting edge (11, 12) is substantially formed by a cylindrical lateral surface (4c) of the pin (4) and the one of the conical or the concave surface (4d) forms a cutting angle (α) with the lateral surface (4c) is which less than 90°.

12. The planetary gear unit according to claim 7, wherein the receiving pin (4) has at least one axial bore (4a, 4b) formed therein.

13. The planetary gear unit according to claim 7, wherein the receiving pin (4) has a pair of opposed coaxial axial bores (4a, 4b) formed therein.

14. The planetary gear unit according to claim 7, wherein the cutting edge (11, 12) is substantially formed by a cylindrical lateral surface (4c) of the pin (4) and one of a conical or a concave surface (4d).

15. The planetary gear unit according to claim 14, wherein the cutting edge (11, 120 is substantially formed by a cylindrical lateral surface (4c) of the pin (4) and the one of the conical or the concave surface (4d) forms a cutting angle (α) with the lateral surface (4c) is which less than 90°.

16. A planetary gear unit (1) having a pair of guide discs (2, 3) being arranged parallel to one another, each of the pair of guide discs (2, 3) having an aperture (7, 8) formed therein for receiving an end of a pin (4), each opposed end of the pin (4) having a journal (5, 6) which is received within one of the apertures (7, 8) and a shoulder (9, 10) for engaging with one of the guide discs (2, 3), and an outer diameter (D1) of the pin (4) being larger than both an outer diameter (D3) of the journal (5, 6) and a diameter (D2) of the perforation (7,8), the each of the shoulders (9, 10) having a hardened circumferential cutting edge (11, 12) for cutting into a surface of the guide discs (2, 3) during a cutting process, and during the cutting process, the respective shoulder (9, 10) cutting into a surface of the guide discs (2, 3) so that a ring-shaped area (18, 19) flows toward and engages with the journal (5, 6) so that, following the cutting process with the pin (4), both of the guide discs (2, 3) engage with the journal (5, 6) and the shoulder (9, 10) and each of the guide discs (2, 3) overlaps a portion of the outer diameter (D1) of the pin (4) so as to connect the pair of guide discs (2, 3) to the pin (4).

17. The planetary gear unit according to claim 16, wherein the receiving pin (4) has at least one axial bore (4a, 4b) formed therein.

18. The planetary gear unit according to claim 16, wherein the receiving pin (4) has a pair of opposed coaxial axial bores (4a, 4b) formed therein.

19. The planetary gear unit according to claim 16, wherein the cutting edge (11, 12) is substantially formed by a cylindrical lateral surface (4c) of the pin (4) and one of a conical or a concave surface (4d).

20. The planetary gear unit according to claim 19, wherein the cutting edge (11, 12) is substantially formed by a cylindrical lateral surface (4c) of the pin (4) and the one of the conical or the concave surface (4d) forms a cutting angle ($\alpha$) with the lateral surface (4c) is which less than 90°.

* * * * *